(12) United States Patent  (10) Patent No.: US 7,789,030 B2
Winkler et al.  (45) Date of Patent: Sep. 7, 2010

(54) AIR CAVITY VESSEL

(75) Inventors: Jørn Paul Winkler, Rotterdam (NL); Konstatin Matveev, Pullman, WA (US)

(73) Assignee: DK Group N.A. N.V., Curacao (AN)

( * ) Notice: Subject to any disclaimer, the term of this patent is extended or adjusted under 35 U.S.C. 154(b) by 0 days.

(21) Appl. No.: 11/995,253

(22) PCT Filed: May 23, 2007

(86) PCT No.: PCT/NL2007/050242

§ 371 (c)(1),
(2), (4) Date: Apr. 28, 2008

(87) PCT Pub. No.: WO2007/136269

PCT Pub. Date: Nov. 29, 2007

(65) Prior Publication Data

US 2009/0126618 A1    May 21, 2009

(30) Foreign Application Priority Data

May 24, 2006 (EP) .................................. 06114535
Dec. 29, 2006 (EP) .................................. 06127366

(51) Int. Cl.
B63B 1/32    (2006.01)
(52) U.S. Cl. .................................. 114/67 A
(58) Field of Classification Search ............... 114/64 A, 114/288, 289
See application file for complete search history.

(56) References Cited

U.S. PATENT DOCUMENTS

| 4,926,771 A |   | 5/1990  | Hull |
|-------------|---|---------|------|
| 5,146,863 A | * | 9/1992  | Ford ........................ 114/67 A |
| 5,816,181 A |   | 10/1998 | Sherman, Jr. |
| 6,575,106 B1|   | 6/2003  | Whitener |
| 6,834,605 B1|   | 12/2004 | Franke |

FOREIGN PATENT DOCUMENTS

| DE | 196 09 574 | 9/1997 |
| FR | 2 826 931  | 1/2003 |
| FR | 2 861 687  | 5/2005 |
| GB | 1024293    | 3/1966 |
| NL | 9301476    | 3/1995 |
| WO | 95/14604   | 6/1995 |

OTHER PUBLICATIONS

International Search Report of corresponding PCT application No. PCT/NL2007/050242 dated Jul. 17, 2007.

* cited by examiner

*Primary Examiner*—Edwin Swinehart
(74) *Attorney, Agent, or Firm*—Young & Thompson

(57) ABSTRACT

A vessel (1) comprising a hull (2) with a stern (5), bow (7) and bottom (3), an air cavity (6) formed at the bottom (3) of the hull (2) and comprising a cavity top surface (27), a front wall (28) and a front section (10) located nearest to the bow (7), and an air inlet (8) located in the air cavity (6), wherein the vessel comprises a wave deflector (9) defining a lower surface (11) which is situated in the front section (10) of the air cavity (6) and at a distance from the cavity top surface (27) and extends from the front wall (28) substantially in the direction of the stern (5).

21 Claims, 3 Drawing Sheets

AIR CAVITY VESSEL

Figure 1A:
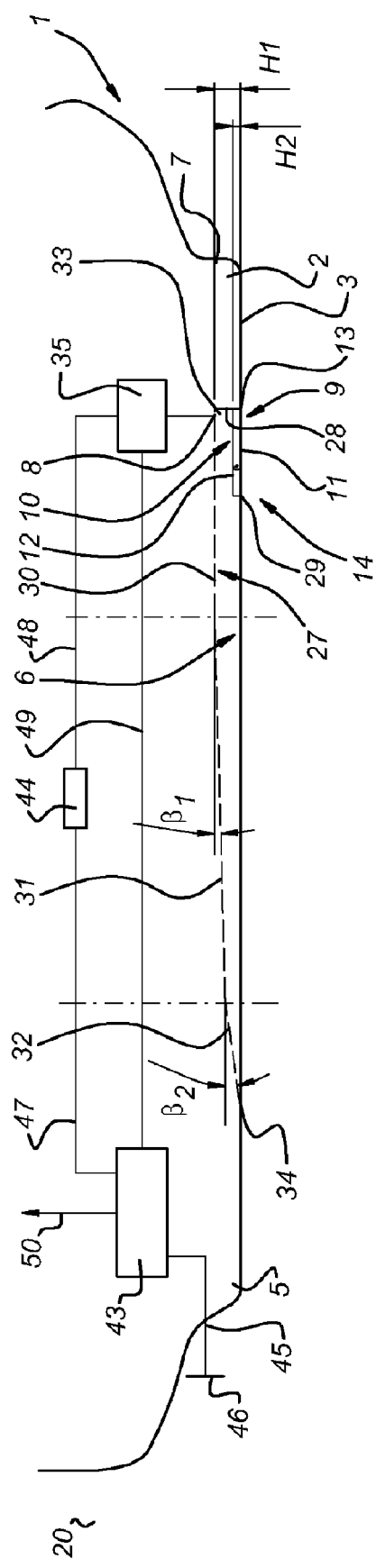

This application claims the benefit of International Application No. PCT/NL2007/050242 filed on May 23, 2007 under 35 U.S.C. §371, entitled, "Air Cavity Vessel" which itself claims the benefit of EP Application No. 06114535.5, filed on May 24, 2006 and EP Application No. 06127366.0, filed on Dec. 29, 2006 all of which are incorporated herein by reference in their entirety.

The invention relates to a vessel comprising a hull with a stern, bow and bottom, an air cavity formed at the bottom of the hull and comprising a cavity top surface, a front wall and a front section located nearest to the bow, and an air inlet located in the air cavity.

Such a vessel is known from patent NL9301476. In this publication a vessel is described having an air cavity formed at the bottom of the hull into which air is injected. In view of reduced friction between the layer of air in the cavity and the water flowing past the hull, the resistance of the vessel is reduced resulting in fuel savings and more economic propulsion. The known vessel has the disadvantage that it can only be used in flat water. When the known vessel is used on water with waves, e.g. on the ocean, the air is not properly contained in the air cavity. Hereby the air cavity does not function well, causing a higher resistance of the vessel and thus lower fuel savings and a less economic propulsion.

It is therefore an object of the present invention to provide a vessel with an air cavity, which vessel has good ocean going properties. This object is achieved by the vessel according the invention which is characterised in mat the vessel comprises a wave deflector defining a lower surface which is situated in the font section of the air cavity and at a distance from the cavity top surface and extends from the front wall substantially in the direction of the stern. The effect of the wave deflector is that it in use deflects the waves which try to move through the air cavity, and especially through the front section. Hereby it prevents that the waves enter the air cavity and push air out of the air cavity. This ensures that when the vessel according the invention is used in water with a non flat surface water or ocean like waves, the air is kept in the air cavity. Hereby the air cavity can function optimally.

In an embodiment of the invention, the wave deflector comprises a turbulence edge for creating turbulence in water flowing past the turbulence edge. Due to the turbulence created in the water flowing over the edge, the water is prevented from flowing back over the lower surface of the wave deflector and from there in the front section of the cavity. The cross section of the wave deflector may comprise in the direction of the longitudinal axis of the vessel substantially a box shape. The turbulence edge may be an edge of a plurality of turbulence creating members provided on the free side of the wave deflector.

In an embodiment of the vessel according the invention the wave deflector comprises a water side which in use is in contact with water and wherein the distance between the water side and the lower surface of the air cavity is between 0.5 and 1.5 m, and preferably 1 m. The front wall may comprises a height HI measured from the cavity top surface and in a direction perpendicular to the cavity top surface and the wave deflector may comprises a thickness H2 measured in the direction perpendicular to the cavity top surface of substantially 0.2-0.5, and preferably 0.25-0.4, of HI. The height HI may be between the 2 and 4 m, preferably 3 m, and the thickness H2 may be between the 0.5 and 1.5 m, preferably 1 m.

In an embodiment of the vessel according the invention the wave deflector comprises a first edge and a second edge which extend from a common apex point at a first distance D1 from the bow, respectively to a first and second point at a second distance D2 from the bow, which second distance D2 is larger than the first distance D1. This specific form of the wave deflector has a positive effect on the ability thereof to prevent that a wave enters the air cavity, and especially the front section. The first and second edges may extend substantially in a straight line such that the directions of the first and second edges are positioned to each other under an angle a of between 5° and 45°, and preferably 25°. The first and second edges may extend from and in the region adjacent to the common apex point such that the first and second edges are curved and are part of a parabolic circle. The first and second distances D1 and D2 may in relation to the vessel length L correspond to: $0.2\,L \leq D2-D1 \leq 0.6\,L$.

In an embodiment of the vessel according the invention the wave deflector comprises displacement means for moving the wave deflector relative to cavity top surface. Hereby the positioning of the wave deflector can be adjusted to the specific circumstances, like wave size and wave frequency. The displacement means may be connected to a control system for controlling the positioning of the wave deflector. The displacement means may be arranged to displace the wave deflector in the direction substantially perpendicular to the cavity top surface and/or to displace the wave deflector in the direction substantially along to the cavity top surface.

In an embodiment of the vessel according the invention the cavity top surface comprises a first surface part which extends from the front side of a top cavity level towards the stern and substantially parallel to the horizontal direction and a second surface part which extends from the first surface part towards the stern to a bottom cavity level and under an angle $\alpha 1$ of between 0.5° and 2.5°, preferably 1.5° relative to the horizontal direction. This specific form of the cavity top surface has a positive effect on the ability to keep the air in the air cavity, and especially in the front section.

In a further embodiment of the vessel according the invention, the vessel comprises emission gas producing driving means which comprise a first gas outlet for transporting emission gas produced by the driving means into the air cavity. By transporting the emission gas from the driving means in the air cavity, the emission gasses will pass through the seawater. As a result of this the emission gasses are subjected to a cleaning process. This cleaning process is generally known as scrubbing. This embodiment enables the user to meet strict environmental regulations. The driving means may comprise a second gas outlet for the discharge of the emission gas outside the air cavity and a second control system for controlling the discharge of the emission gas through the first and second outlet. Hereby the user of the vessel can choose whether the emission gas is transported inside the air cavity to achieve the scrubbing effect or whether the emission gas discharged outside the air cavity, for example in the free air. This is favourable when the vessel at certain places, for example in a harbour, is not allowed to discharge the emission gasses through the seawater.

By providing air removing means to an air cavity vessel, the air can be removed rapidly from the air cavity. By doing so, the friction between the vessel and the water is increased. This has a positive effect on the braking distance of a vessel cavity vessel.

Figure 1B:
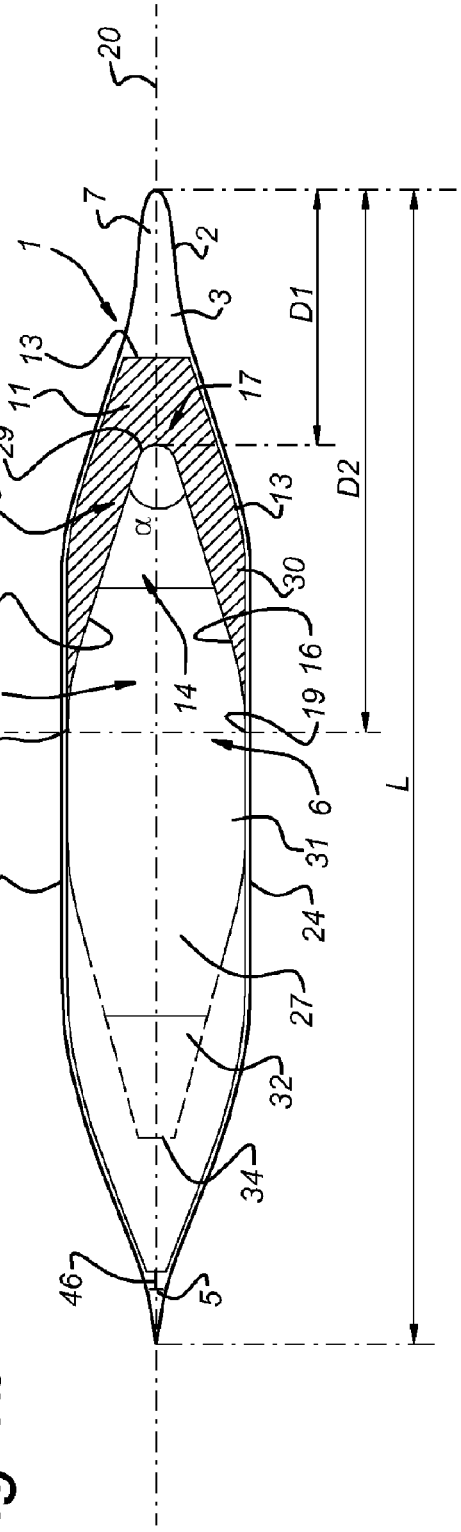

The invention will in the subsequent part be discussed in detail with reference to the accompanying figures, wherein:

FIG. 1a shows a schematically side view in cross section of an embodiment of the vessel according the invention, and FIG. 1b shows a schematically bottom view of the vessel of FIG. 1.

Figure 2:
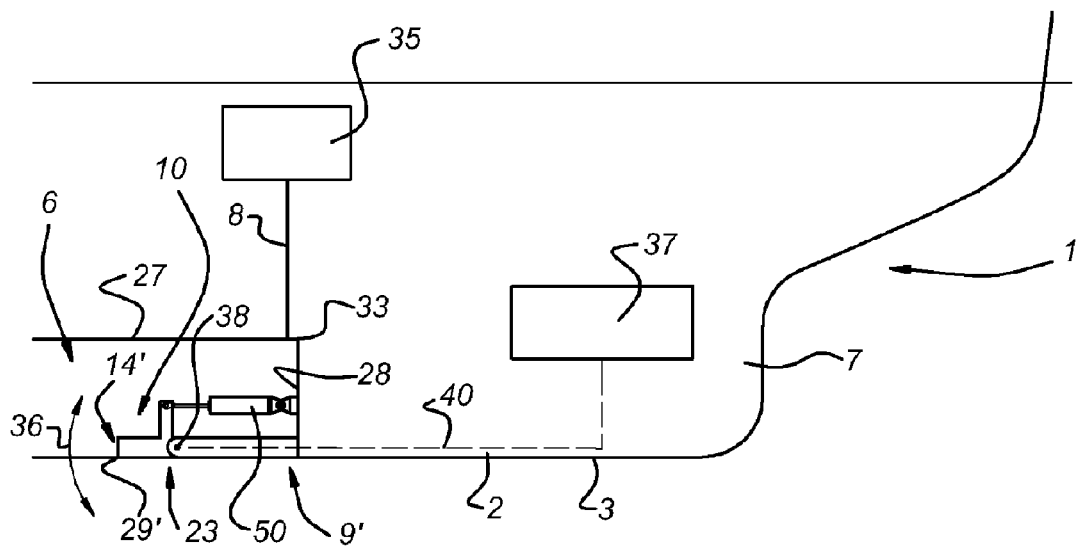
Figure 3:
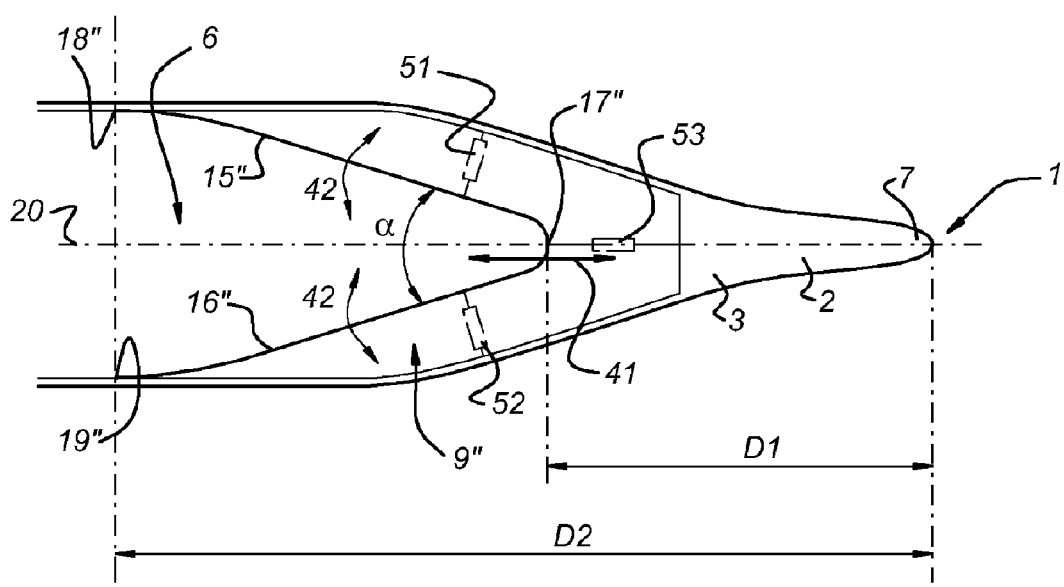
Figure 4:
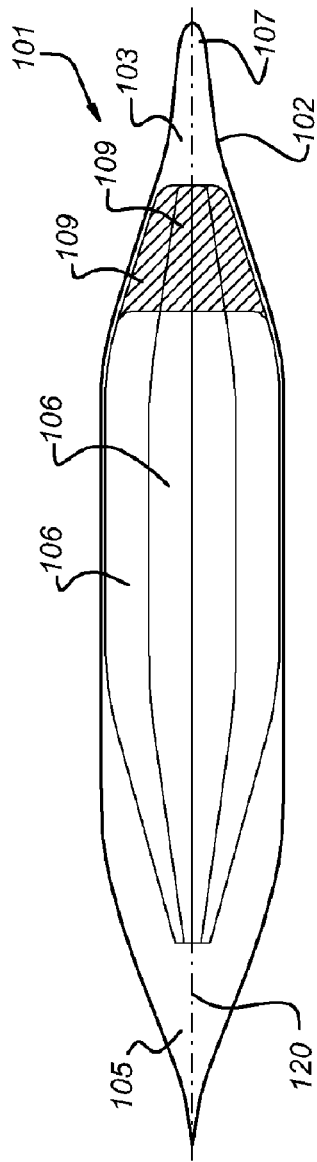
Figure 5:
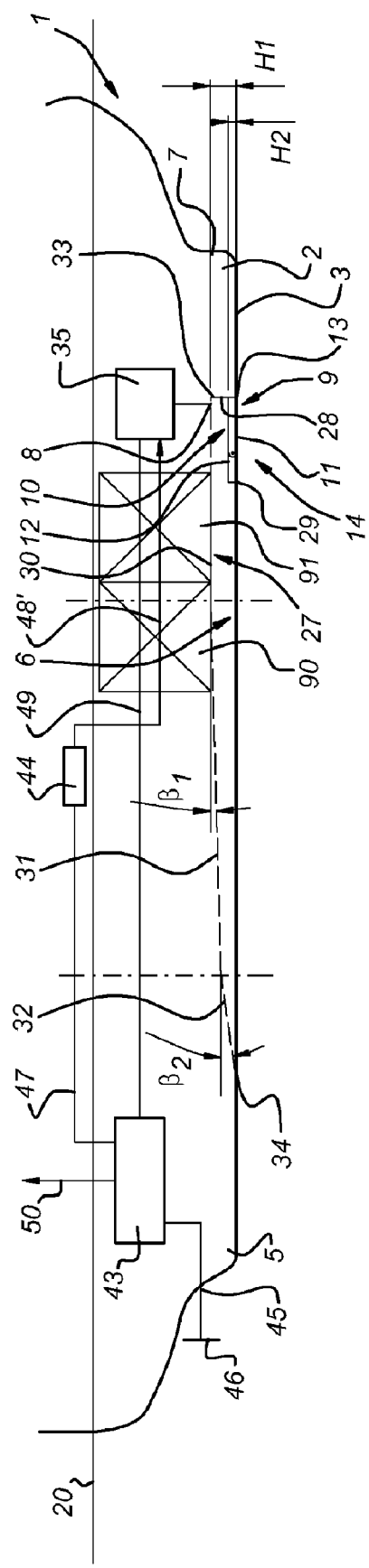

FIG. 2 shows a schematically bottom view of the vessel of FIG. 1 provided with an adjustable wave deflector, FIG. 3 shows a schematically bottom view of the vessel of FIG. 1 provided with an adjustable wave deflector, FIG. 4 shows a schematically bottom view of a vessel according the invention, provided with more than one air cavities, and FIG. 5 shows an embodiment wherein the exhaust gases are fed through the water of the ballast tanks prior to entering into the air cavity.

FIG. 1 *a* and *b* show an embodiment of the vessel 1 according the invention. The vessel 1 comprises a hull 2, a bottom 3, a bow 7, a stein 5 and a longitudinal axis 20. The longitudinal axis 20 extends in the horizontal direction. The transverse direction of the vessel is indicated by the arrow 39. An air cavity 6 is formed at the bottom 3 of hull 2. The air cavity 6 comprises a cavity top surface 27, a front wall 28 and a front section 10. The front section 10 is located nearest to the bow 7. An air supply means 35 connected air inlet 8 is located in the front section 10 to provide air to the air cavity 6. A wave deflector 9 is situated in the front section 10 of the air cavity 6 and at a distance of the cavity top surface 27. The wave deflector 9 has a connection side with which the wave deflector 9 is connected to the front wall 28. The wave deflector 9 extends from the front section 10 in the direction of the stern 5 to a free side 14 of the wave deflector 9, which free side extends freely across the air cavity 6.

The wave deflector 9 has a box shaped in cross section. The turbulence edge 29 of the wave deflector 9 creates turbulence in water which in use flows past the turbulence edge 29. One side of the wave deflector 9 forms the lower surface 12 of the air cavity 6 and the other side forms the water side 11 of the wave deflector 9. The wave deflector 9 has a thickness H2, measured in the direction perpendicular to the cavity top surface 27. The free side 14 of the wave deflector 9 has a first edge 15 and an opposite second edge 16, which edged 15 and 16 extend from a common apex point 17 to a first and second point 18 and 19. The common apex point 17 is located at a first distance D1 from the bow 7 and the first and second points 18 and 19 are located at a second distance D2 from the bow 7. The vessel length is indicated by L. L may be between 100 and 300 meters. The width of the vessel may be between 20 and 50 meters and the height between 15 and 30 meters. The first and second edged 1.5 and 16 extend from and in the region of the common apex point 17 such that the edges 15 and 16 are curved and are part of a parabolic curve. From there the edges 15 and 16 each extend further in a substantially straight line, wherein said straight lines of the edges 15 and 16 are positioned to each other under an angle α of 25°. The first and second points 18 and 19 intersect with the bottom edges 24 of the bottom 3.

The front wall 28 has a height HI, of substantially 3 meters, measured from the cavity top surface 27 and in the direction perpendicular to the cavity top surface 27. The cavity top surface 27 extends from a top cavity level 33 to a bottom cavity level 34 and comprises a first, second and third surface part 30, 31 and 32. The first surface part 30 extends from the front side 28 towards the stern 5 and parallel to the horizontal direction. The second surface part 31 extends from the first surface part 30 towards the stern 5 under an angle β1 of 1.5° relative to the horizontal direction. The third surface part 32 extends from the second surface part 31 towards the stern 5 under an angle β 2 of 7° relative to the horizontal direction. The angle β 2 may also be between the 4° and 10°.

The vessel 1 further comprises emission gas producing driving means 43 which are connected to a screw propeller 46 by an actuation connection 45. The driving means 43 comprises a first gas outlet 49 which is connected to the air supply means 35 and a second gas outlet 50 which discharges the emission gas in the free air. The driving means 43 and the air supply means 35 are by a second and third communication connection 47 and 48 respectively connected to a second control system 44. The second control system 44 controls whether the emission gas is discharged in the first or second gas outlet 49 and 50. The emission gas transported through the first gas outlet 49 enters the air supply means 35 which blows the emission gas (in combination with air) through the air outlet 8 and inside the air cavity 6.

FIG. 2 shows the vessel of FIG. 1 provided with an adjustable wave deflector 9'. The wave deflector 9' comprises displacement means 23 for moving the deflector 9' relative to the vessel 1. The displacement means 23 comprise a first drive member 50 which moves the free side 14 of the wave deflector 9' relative to the cavity top surface 27. The free side 14' is pivotable around a pivot axis 38 extending in the transverse direction (39 of FIG. 1*b*). The displacement means 23 are by a communication connection 40 connected to control means 37 for controlling the positioning of the wave deflector 9'.

FIG. 3 shows the vessel of FIG. 1 provided with an adjustable wave deflector 9". In this case the wave deflector 9" is displaceable in the direction substantially along the cavity top surface 27. The common apex point 17" and the first and second point 18" and 19" function as displaceable hinging points which allow adjusting of the wave deflector 9". The wave deflector 9" can be adjusted such that the common apex point 17" is displaced in the direction of the longitudinal axis 20, as indicated by arrow 40. Hereby the first distance D1 will be adjusted. This displacement is actuated by a second drive member 53 which is located inside the air cavity 6. The first and second edges 15" and 16" can be displaced such that the angle α" is adjusted, as indicated by the arrows 42. This may result in an adjustment of the second distance D2 (displacement of the first and second points 18" and 19"). This displacement is actuated by a third and fourth drive member 51 and 52 which are located inside the air cavity 6. The displacements indicated by the arrows 40 and 42 may be performed independently or combined.

FIG. 4 shows a vessel according the invention, provided with more than one air cavities 109. The vessel 101 comprises a hull 102 with a stern 105, bow 107 and bottom 103. At the bottom 103 of the hull 102 are four air cavities 106 formed. Each of the air cavities 106 comprises a wave deflector 9 which can comprise all features disclosed above. The air cavities 106 are positioned substantially parallel to each other and extend substantially in the direction of the longitudinal axis 120 of the vessel 101. The vessel comprises preferably between 2 and 5 air cavities.

As shown in FIG. 5, the exhaust gases from the driving means 43 are passed via the duct 48' through the water in the ballast tanks 90, 91. By passing the exhaust gases from the ship's diesel engine through the ballast water prior to entering the exhaust gases into the cavity for powering the cavity, not only an effective filling of the cavity is achieved but also can the water in the ballast tanks be disinfected so as to reduce bacterial activity. It was furthermore found that passing the exhaust gases through the ballast water, an effective wet scrubbing of said gases can be achieved so as to reduce the particulate matter in the exhaust gases, such as sooth, and to cool the gases prior to entering into the cavity. The reduced temperature results in reduced corrosion of the cavity.

It will be clear to the person skilled in the art that many modifications of the embodiments of the present invention are possible without departing from the scope of protection as defined in the accompanying claims.

The invention claimed is:

1. A vessel (1), comprising:
a hull (2) with a stern (5), bow (7) and bottom (3) and a longitudinal axis (20);
an air cavity (6) formed at the bottom (3) of the hull (2), the air cavity (6) comprising a cavity top surface (27), a front wall (28) and a front section (10) located nearest to the bow (7);
a mechanical air supply means (35);
an air inlet (8) located in the air cavity (6) connected to the air supply means (35) to mechanically provide air to the air cavity; and
a wave deflector (9) defining a lower surface (12) and a water side (11), the wave deflector (9) situated in the front section (10) of the air cavity (6) and at a distance from the cavity top surface (27) and extending from the front wall (28) to a side (14) substantially in the direction of the stern (5), wherein,
the front wall (28) comprises a height (H1) measured from the cavity top surface (27) in a direction perpendicular to said top surface,
the wave deflector comprises a thickness (H2) between the lower surface (12) and the water side (11) measured in the direction perpendicular to said top surface (27),
the wave deflector thickness (H2) is substantially between 0.2-0.5 the front wall height (H1), and
cross sections of the wave deflector (9) in the direction of the longitudinal axis (20) of the vessel (1) are substantially box-shaped, the wave deflector (9) being with a connection side connected to the front wall (28), the side (14) being a free side, and the water side (11) of the wave deflector (9) is situated substantially at the height of the bottom (3).

2. The vessel according to claim 1, wherein the water side (11) in use is in contact with water and the distance between the water side (11) and the lower surface (12) of the air cavity (6) is between 0.5 and 1.5 m.

3. The vessel according to claim 1, wherein the wave deflector (9) comprises a first edge (15) and a second edge (16) which extend from a common apex point (17) at a first distance (D1) from the bow (7), respectively to a first and second point (18, 19) at a second distance (D2) from the bow (7), which second distance (D2) is larger than the first distance (Di).

4. The vessel according to claim 3, wherein the fist and second edges (15, 16) extend substantially in a straight line such that the directions of the first and second edges (15, 16) are positioned to each other under an angle a of between 5° and 45°, and the first and second distances (D1 and D2) in relation to the vessel length (L) correspond to:

$$0.2\,L \leqq D2-D1 \leqq 0.6\,L.$$

5. The vessel according to claim 3, wherein the fist and second edges (15,16) extend from and in the region adjacent to the common apex point (17) such that the fist and second edges (15,16) are curved and are part of a parabolic circle.

6. The vessel according to claim 1, wherein the wave deflector (9) comprises displacement means (23) for moving the wave deflector (9) relative to cavity top surface (27).

7. The vessel according to claim 6, wherein the displacement means (23) are arranged to displace the wave deflector (9) in the direction substantially perpendicular to the cavity top surface (27).

8. The vessel according to claim 6, wherein the displacement means (23) are arranged to displace the free side (14) in the direction substantially along to the cavity top surface (27).

9. The vessel according to claim 1, wherein the cavity top surface (27) comprises a first surface part (30) which extends from the front side (28) of a top cavity level (33) towards the stern (5) and substantially parallel to the horizontal direction and a second surface part which extends from the fist surface part (30) towards the stern (5) to a bottom cavity level (34) and under an angle of between 0.5° and 10° relative to the horizontal direction.

10. The vessel according to claim 1, wherein the air inlet (8) is located in the front section (10) of the air cavity (6).

11. The vessel according to claim 1, wherein the vessel (1) comprises emission gas producing driving means (43) which comprise a first gas outlet (49) for transporting emission gas produced by the driving means (43) into the air cavity (6).

12. The vessel according to claim 11, wherein the driving means (43) comprise a second gas outlet (50) for the discharge of the emission gas outside the air cavity (6) and a second control system (44) for controlling the discharge of the emission gas through the first and second outlet (49 and 50).

13. The vessel (101) according to claim 1, wherein the vessel comprises more than one air cavities (106) which comprise a wave deflector (109) and wherein the air cavities (106) are positioned substantially parallel to each other and extend substantially in the direction of the longitudinal axis (120) of the vessel.

14. The vessel according to claim 1, further comprising a combustion engine (43) for propulsion of the vessel, and ballast tanks (90,91) comprising water, wherein exhaust gases from the combustion engine are led to the air cavity (6) via the ballast tanks (90,91) through the ballast water.

15. The vessel according to claim 14, the combustion engine (43) comprising a diesel engine, and the exhaust gases reducing bacterial activity in the ballast water.

16. The vessel according to claim 14, the concentration of particulate matter in the exhaust gases that exit from the ballast tanks being lower compared to the particulate matter concentration of the exhaust gases before entering into the ballast tank.

17. The vessel according to claim 1, wherein the temperature of the exhaust gases exiting from the ballast tanks is lower than the temperature of the exhaust gases entering the ballast tanks.

18. The vessel according to claim 2, wherein the fist and second edges (15,16) extend substantially in a straight line such that the directions of the first and second edges (15, 16) are positioned to each other under an angle a of 25°, and the first and second distances (D1 and D2) in relation to the vessel length (L) correspond to: $0.2\,L \leqq D2-D1 \leqq 0.6\,L$.

19. The vessel according to claim 1, wherein the water side (11) in use is in contact with water and the distance between the water side (11) and the lower surface (12) of the air cavity (6) is 1 m.

20. The vessel according to claim 1, wherein the the thickness H2 is between 0.25-0.4 of the front wall height (H1).

21. The vessel according to claim 1, wherein the cavity top surface (27) comprises a first surface part (30) which extends from the front side (28) of a top cavity level (33) towards the stern (5) and substantially parallel to the horizontal direction and a second surface part which extends from the fist surface part (30) towards the stern (5) to a bottom cavity level (34) and under an angle of about 1.5° relative to the horizontal direction.

* * * * *